United States Patent
Morse et al.

(10) Patent No.: US 10,106,028 B1
(45) Date of Patent: Oct. 23, 2018

(54) INTERNAL TRANSMISSION OIL COOLER MOUNTING STRATEGY

(71) Applicant: GM GLOBAL TECHNOLOGY OPERATIONS LLC, Detroit, MI (US)

(72) Inventors: Andrew G Morse, Shelby Township, MI (US); Jared J Keyes, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 15/609,075

(22) Filed: May 31, 2017

(51) Int. Cl.
*B60K 11/04* (2006.01)
*F16H 57/04* (2010.01)
*F01P 11/08* (2006.01)

(52) U.S. Cl.
CPC ............... *B60K 11/04* (2013.01); *F01P 11/08* (2013.01); *F16H 57/0475* (2013.01); *F16H 57/0417* (2013.01)

(58) Field of Classification Search
CPC  B60K 11/02; B60K 11/04; F01P 11/00; F01P 11/08; F16H 57/0475; F16H 57/0417
See application file for complete search history.

(56) References Cited

U.S. PATENT DOCUMENTS

| | | | | |
|---|---|---|---|---|
| 2,754,868 A | * | 7/1956 | Manis | F01P 11/00 383/110 |
| 2,811,337 A | * | 10/1957 | Andersen | F01P 11/08 165/158 |
| 4,130,159 A | * | 12/1978 | Ohta | B60K 11/04 123/41.54 |
| 4,227,570 A | * | 10/1980 | Crews | F01P 11/08 165/140 |
| 4,836,147 A | * | 6/1989 | Morris | F01P 7/164 123/41.44 |
| 4,903,760 A | * | 2/1990 | Joshi | F01P 11/08 123/196 AB |
| 5,048,596 A | * | 9/1991 | Lu | F28D 7/1607 123/196 AB |
| 5,067,561 A | * | 11/1991 | Joshi | F01P 11/08 123/41.33 |
| 5,570,737 A | * | 11/1996 | Tokutake | F28D 1/0535 165/67 |
| 5,660,149 A | * | 8/1997 | Lakerdas | F01P 5/06 123/41.01 |
| 5,711,370 A | * | 1/1998 | Tanaka | F28F 9/002 165/153 |
| 5,937,938 A | * | 8/1999 | Makino | F01P 11/08 165/140 |
| 6,082,449 A | * | 7/2000 | Yamaguchi | F28D 9/0075 165/153 |

(Continued)

*Primary Examiner* — Erez Gurari (57) ABSTRACT

A method for internal transmission oil cooler (ITOC) mounting includes molding an ITOC end tank to include at least one aperture extending through an external fluid port for connecting a transmission fluid line. At least one ITOC mounting fixture is disposed internal to the ITOC end tank, and an ITOC having at least one fluid aperture surrounded by an O-ring is aligned with the at least one mounting fixture. The ITOC is snapped into the at least one mounting fixture to create a press fit fluid seal between the O-ring and the at least one aperture of the end tank.

11 Claims, 6 Drawing Sheets

(56) References Cited

U.S. PATENT DOCUMENTS

| | | | | |
|---|---|---|---|---|
| 7,516,779 B1* | 4/2009 | Marcus | ............... | F28D 7/106 |
| | | | | 165/140 |
| 8,069,911 B2* | 12/2011 | Hori | ............... | F28F 9/0234 |
| | | | | 165/137 |
| 2004/0173341 A1* | 9/2004 | Moser | ............... | F28D 7/08 |
| | | | | 165/148 |
| 2006/0081361 A1* | 4/2006 | Gabbey | ............... | F01M 5/002 |
| | | | | 165/119 |
| 2006/0113068 A1* | 6/2006 | Desai | ............... | F28D 1/0417 |
| | | | | 165/140 |
| 2007/0272460 A1* | 11/2007 | Riniker | ............... | B60K 11/04 |
| | | | | 180/68.4 |
| 2011/0061744 A1* | 3/2011 | Zillig | ............... | F15B 21/042 |
| | | | | 137/15.01 |
| 2012/0328390 A1* | 12/2012 | Colpan | ............... | F25B 39/04 |
| | | | | 411/166 |
| 2013/0264036 A1* | 10/2013 | Kardos | ............... | F02B 29/0462 |
| | | | | 165/148 |
| 2014/0060784 A1* | 3/2014 | Ostapowicz | ............... | F01M 5/002 |
| | | | | 165/148 |
| 2015/0176925 A1* | 6/2015 | Tylutki | ............... | F28F 5/00 |
| | | | | 165/96 |
| 2016/0121710 A1* | 5/2016 | Holmes | ............... | B60K 11/04 |
| | | | | 165/153 |

* cited by examiner

INTERNAL TRANSMISSION OIL COOLER MOUNTING STRATEGY

TECHNICAL FIELD

The following disclosure relates generally to heat exchangers and, more particularly, to an internal transmission oil cooler mounting strategy.

BACKGROUND

Heat exchangers are well-known devices utilized to promote heat transfer between materials, such as fluids. In the case of a vehicular transmission oil coolers, for example, heat may be transferred from a liquid coolant to airflow directed through the cooler's core to dissipate excess heat generated by transmission or other heat source onboard the vehicle.

Transmission coolers can be provided as stand-alone external devices or combined with an existing fluid cooler, e.g., internal combustion (ICE) engine radiator, sometimes referred to as an internal transmission oil cooler (ITOC). Installing the transmission cooler is relatively simple if adequate space is available for mounting the cooler at a location, e.g., front of the engine compartment, where it will be exposed to continuous maximum airflow during vehicle operation to ensure optimal cooling. Other than packaging the cooler where it can provide optimal performance, an efficient installation and mounting strategy includes determining the best way to connect the fluid lines that route the heated fluid through the device for cooling.

Several fluid lines and fittings are available for connecting the transmission to a fluid cooler. However, while current strategies installation and mounting transmission cooler assemblies are sufficient for fulfilling that intended purpose, there is a desire to provide additional strategies to make mounting and installation faster and easier.

BRIEF SUMMARY

One or more exemplary embodiments address the above issue by providing an internal transmission cooler mounting strategy. Accordingly, aspects of an exemplary embodiment include molding an ITOC end tank including at least one aperture extending through an external fluid port for connecting a transmission fluid line, and disposing at least one ITOC mounting fixture internal to the ITOC end tank. Other aspects include aligning an ITOC having at least one fluid aperture surrounded by an O-ring with the at least one mounting fixture, and snapping the ITOC into the at least one mounting fixture to create a press fit fluid seal between the O-ring and the at least one aperture of the end tank.

Another aspect of as according to the exemplary embodiment includes buttressing the ITOC against an internal front wall of the ITOC end tank with the at least one mounting fixture disposed on a rear wall of the ITOC end tank. And another includes restricting lateral movement of the ITOC with the least one mounting fixture disposed on an internal front wall of the ITOC end tank. Still another includes fastening a retaining brace to at least one mounting fixture for restricting vertical elevation of the ITOC after installing.

And still another aspect of the exemplary embodiment includes inserting at least one replaceable ITOC mounting fixture internal to the ITOC end tank. And yet another aspect includes molding the at least one ITOC mounting fixture internal to the ITOC end tank.

An ITOC mounting assembly in accordance with the exemplary embodiment includes an ITOC end tank having at least one aperture extending through an integrally molded external fluid port for connecting a transmission fluid line, and an ITOC having at least one fluid aperture surrounded by an O-ring placed in alignment with at least one mounting fixture and the at least one aperture of the end tank. Further aspects include an internal front wall of the ITOC end tank, and at least one ITOC mounting fixture internally disposed on a rear wall of the ITOC end tank configured to buttress the ITOC against the internal front wall to form a press fit fluid seal between the at least one fluid aperture of the ITOC and the at least one aperture of the end tank.

Still further aspects of an ITOC mounting assembly include at least one mounting fixture disposed on the internal front wall of the ITOC end tank configured to restrict lateral movement of the ITOC, and a retaining brace releasably fastened to at least one mounting fixture for restricting vertical elevation of the ITOC after installation. And yet a further aspect includes at least one replaceable ITOC mounting fixture disposed internal to the ITOC end tank. And another aspect wherein the at least one ITOC mounting fixture is integrally molded internal to the ITOC end tank.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. There is no intention to be bound by any theory presented in the preceding Background or the following Detailed Description. The term "exemplary," as appearing throughout this document, is synonymous with the term "example" and is utilized below to emphasize that the following description should not be interpreted to limit the scope of the invention, as set-out in the appended Claims.

Figure 1:
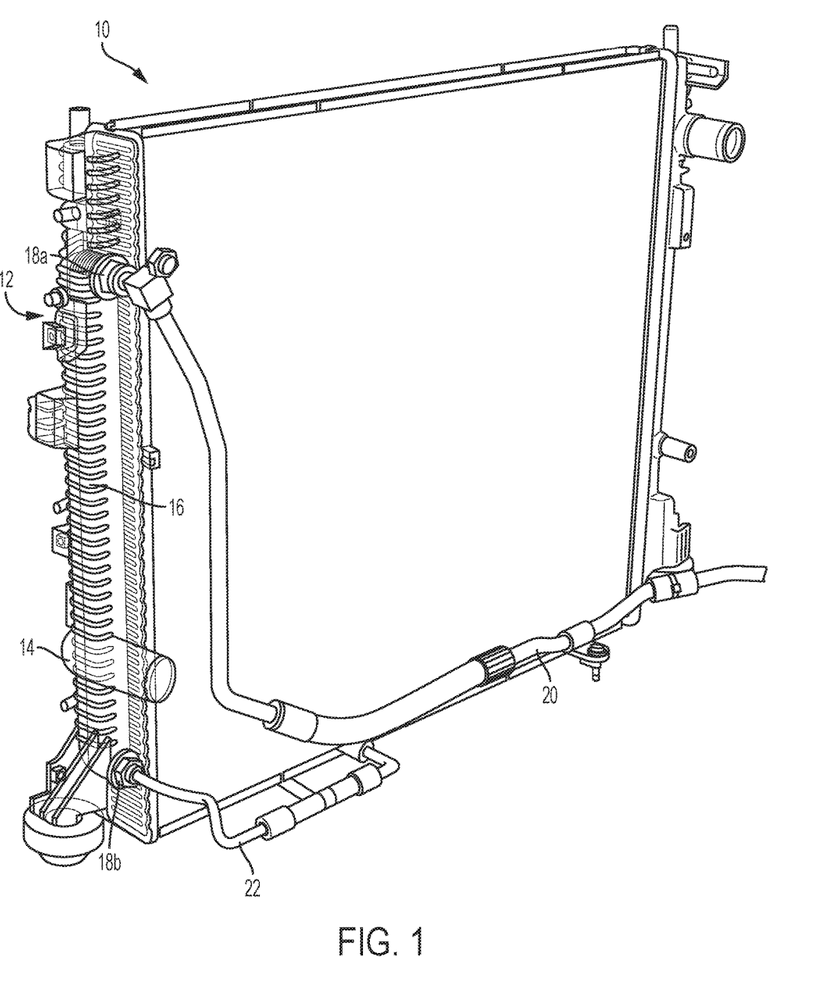
FIG. 1 is an illustration of a perspective view of a heat exchanger including a current ITOC mounting strategy in contrasting view of aspects in accordance with an exemplary embodiment of the invention.

Referring to FIG. 1, an illustration of a perspective view of a heat exchanger 10 including a current ITOC mounting strategy in contrasting view of aspects in accordance with an exemplary embodiment is provided. An internal transmission oil cooler (ITOC) assembly 12 includes an ITOC 16 disposed internal to an ITOC end tank 14 (transparently illustrated) mounted on a side end of radiator for cooling engine fluid. Transmission oil lines (20, 22) are attached to the ITOC assembly 12 with connectors (18a, 18b) which provide a fluid seal when properly engaged and tightened to the ITOC assembly. The transmission oil line 20 delivers heated transmission oil from the vehicle transmission (not shown) to pass through the ITOC assembly 12 for cooling via outside airflow and then returned to the transmission through oil line 22 to mitigate transmission overheating.

Figure 2:
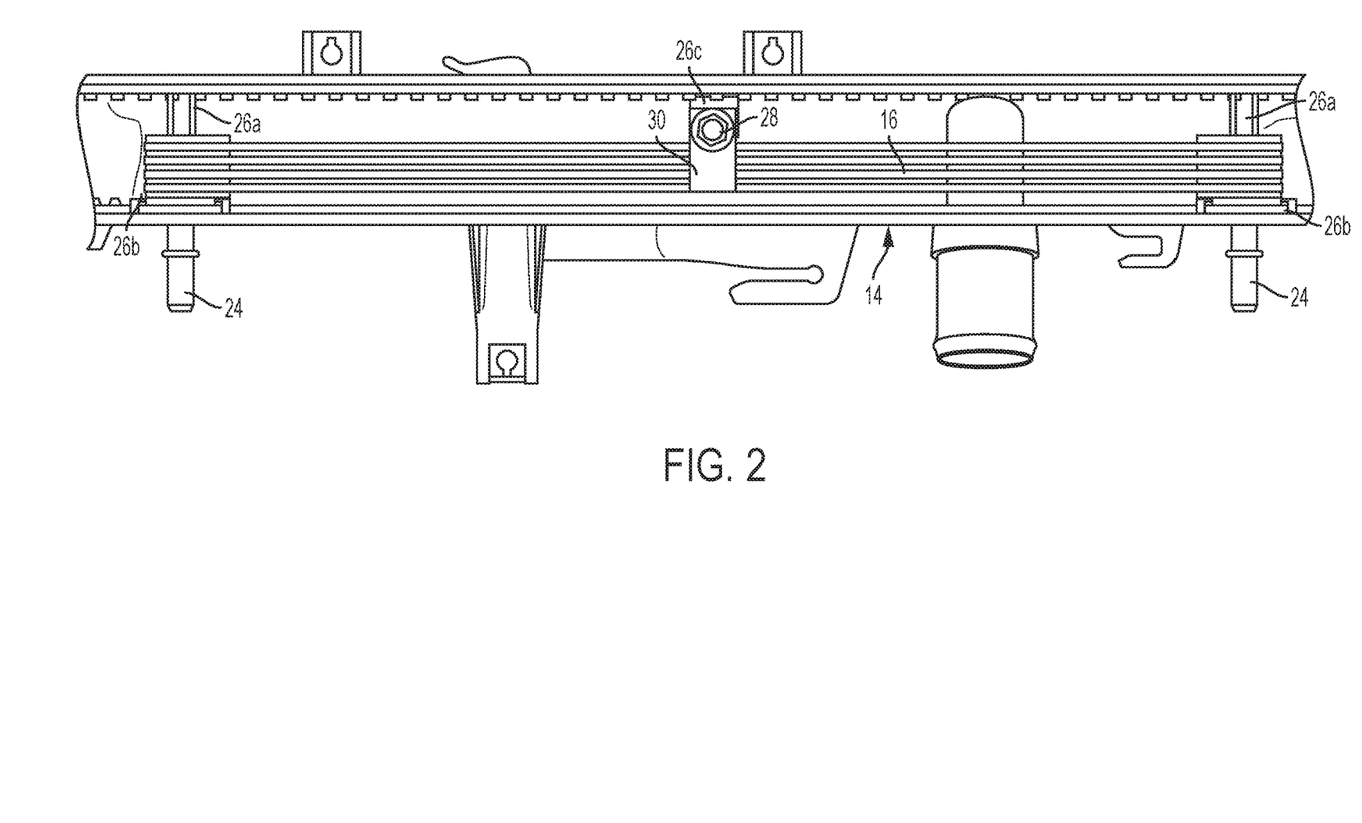
FIG. 2 is an overhead view of the ITOC mounting strategy in accordance with aspects of an exemplary embodiment.

FIG. 2 is an overhead view of the ITOC mounting strategy wherein molded ITOC end tank 14 having the ITOC 16 disposed inside and at least one aperture (not shown here) extending through an external fluid port 24 for connecting a transmission fluid line (20, 22) as according to the exemplary embodiment. The molded ITOC end tank 14 also includes at least one ITOC mounting fixture (26a, 26b, 26c) for retaining the ITOC 16 therein. The at least one mounting fixture (26a-26c) may be replaceable such that aftermarket parts can be obtained if the fixtures become worn or damaged. In a preferred exemplary embodiment, the at least one mounting fixture (26a-26c) is molded integral to the ITOC end tank 14.

The at least one mounting fixture 26a is illustrated as ribs mounted on a rear wall of the ITOC end tank 14 to buttress the ITOC against the front wall of the ITOC end tank. The at least one mounting fixture 26b is configured and disposed on the front wall of the ITOC end tank 14 to restrict lateral movement of the ITOC 16 after it is installed. And the at least one mounting fixture 26c is provided for buttressing the ITOC 16, and for receiving a fastener 28 to retain a brace 30 to restrict vertical elevation of the ITOC 16 after it is installed in accordance with aspects of the exemplary embodiment.

Figure 3A:
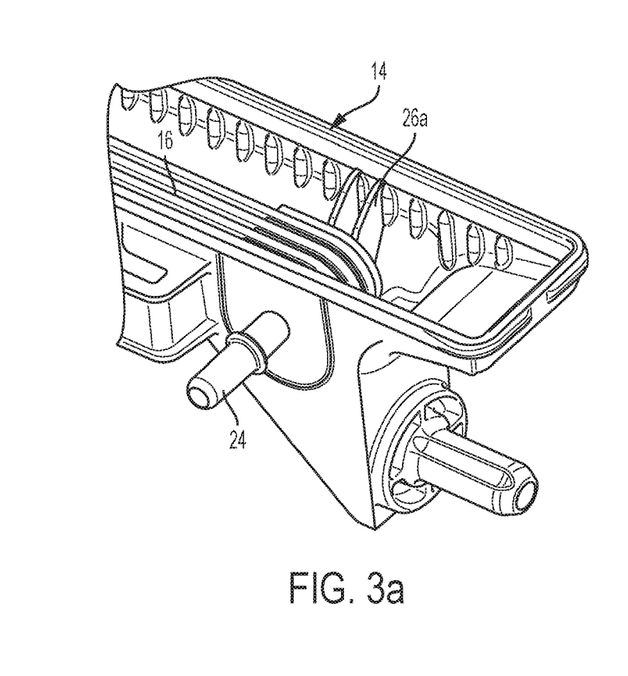
FIG. 3A is an illustration of a sectional view of the ITOC end tank mounting strategy in accordance with the exemplary embodiments of the present disclosure.
Figure 3B:
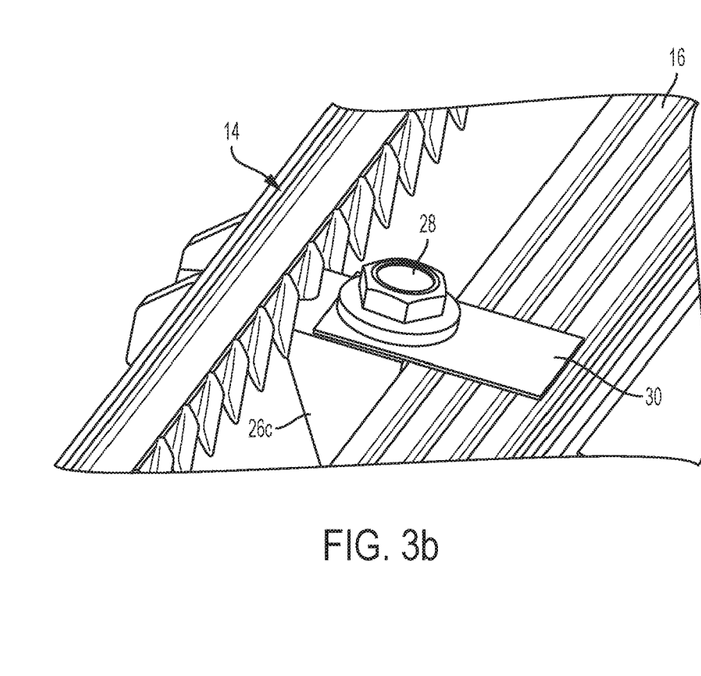
FIG. 3B is an illustration of another sectional view of the ITOC end tank mounting strategy in accordance with aspects of the exemplary embodiment.

Referring now to FIGS. 3A & 3B, illustrations of sectional views of the ITOC end tank mounting strategy in accordance with the exemplary embodiments are provided. In FIG. 3A, a closer view of the at least one mounting fixture 26a used for buttressing the ITOC 16 against the front wall of the ITOC end tank 14 at the location of the external fluid port 24. FIG. 3B provides a closer view of the at least one mounting fixture 26c being configured to receive a fastener 28 for holding a brace 30 to prevent vertical movement of the ITOC 16 after insertion in to the ITOC end tank 14.

Figure 4:
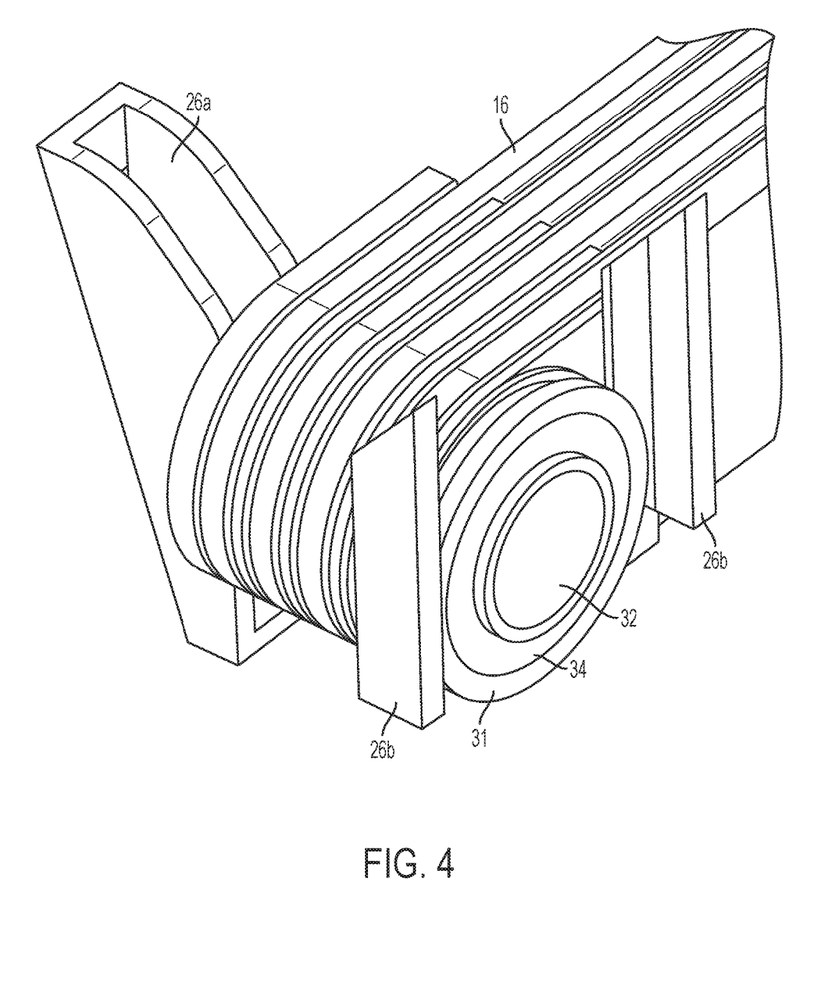
FIG. 4 is an illustration of a sectional view of an ITOC disposed in mounting fixtures in accordance with aspects of the exemplary embodiment.

FIG. 4 is an illustration of a sectional view of an ITOC 16 disposed in mounting fixtures in accordance with aspects of the exemplary embodiment. Notably, the ITOC 16 is disposed between the buttressing mounting fixture 26a and the lateral movement retaining mounting fixture 26b for enhanced stability. The ITOC 16 includes an annular collar 31 formed at end portion of the ITOC retained from lateral movement by the mounting fixture 26b. The ITOC 16 also includes at least one fluid aperture 32 surrounded by an O-ring 34. Transmission oil will enter (or exit) through the fluid aperture accordingly when the vehicle is in operation.

Figure 5:
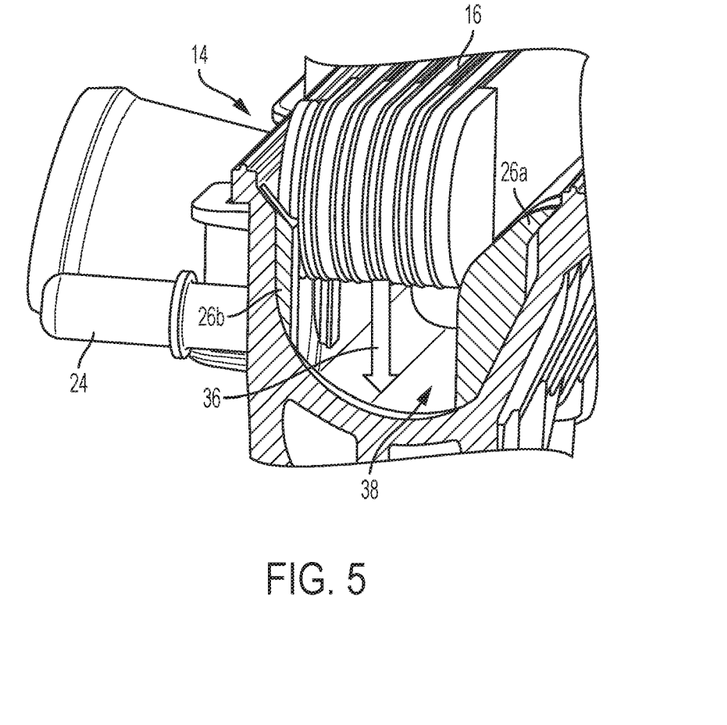
FIG. 5 is an illustration of an ITOC being inserted into the ITOC end tank in accordance with aspects of the exemplary embodiment.
Figure 6:
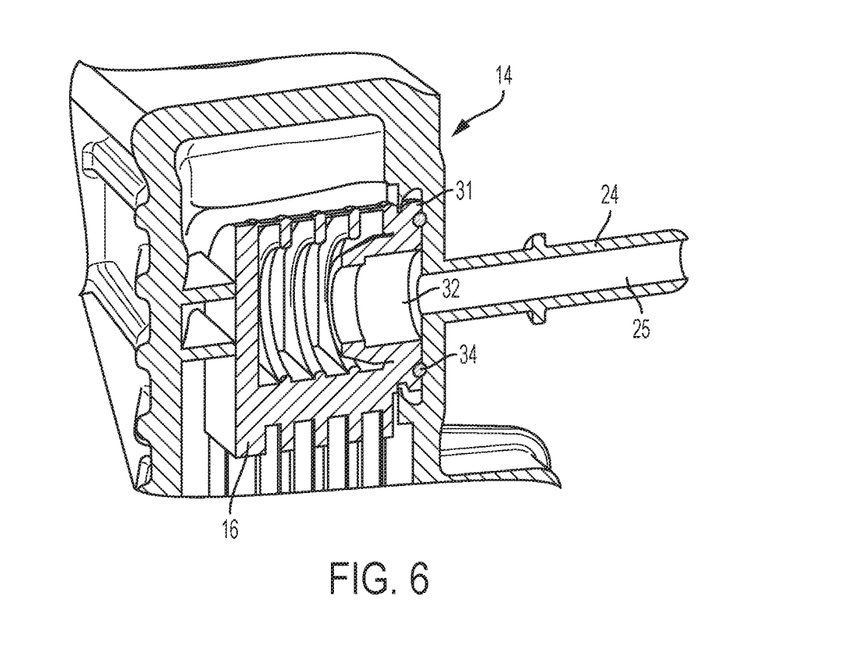
FIG. 6 is an illustration of a cross-sectional view of an ITOC disposed in an ITOC end tank in accordance with aspects of an exemplary embodiment of the present disclosure.

Referring now to FIG. 5, an illustration of an ITOC being inserted into the ITOC end tank in accordance with aspects of the exemplary embodiment is provided. The ITOC 16 having the at least one fluid aperture 32 with surrounded by an O-ring 34 is aligned with the at least one mounting fixture (26a-26c) and inserted in the direction of arrow 36 until it abuts the surface 38 of the ITCO end tank 14. As illustrated best in the cross-sectional view of FIG. 6, the at least one aperture 32 of the ITOC 16 is inserted into the ITOC end tack 14 to create a press fit fluid seal between the O-ring 34 and the at least one aperture 25 extending through an external fluid port 24 of the end tank 14. The ITOC 16 is pressed into the at least one mounting fixture (26a-26c) to ensure proper installation or until a haptic snap may be felt or heard.

Figure 7:
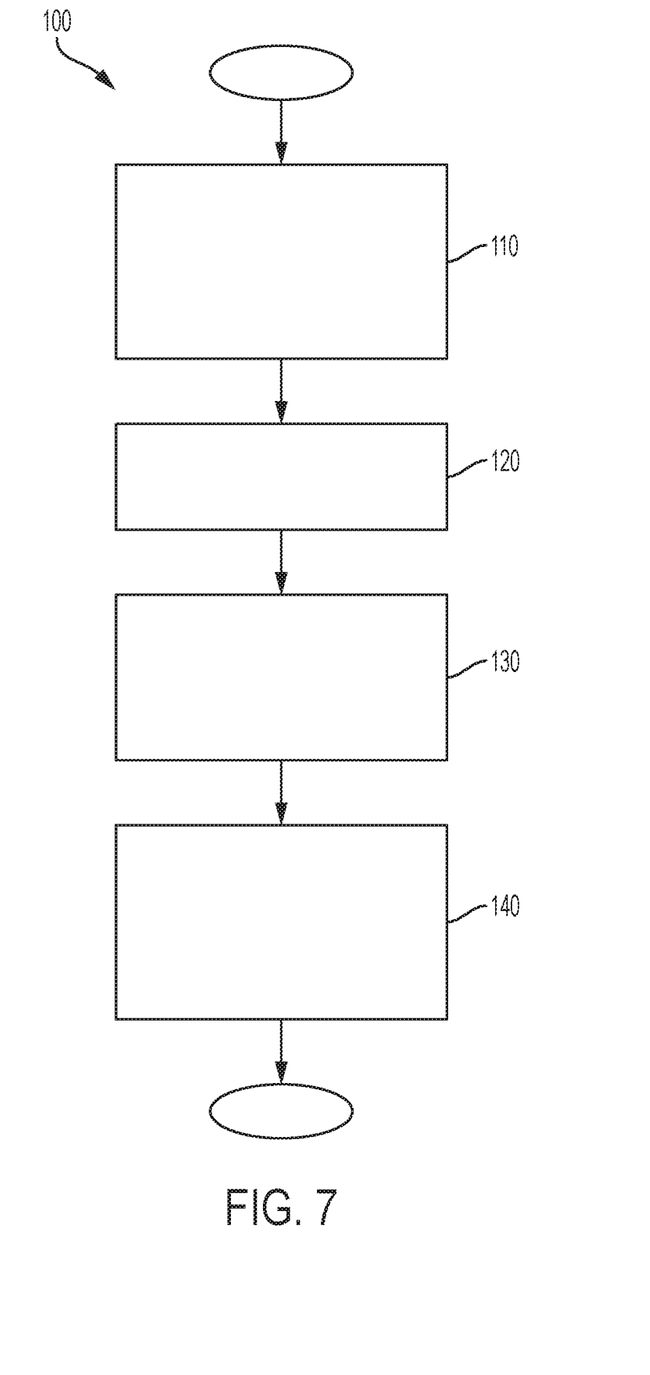
FIG. 7 is an algorithm for an internal ITOC mounting strategy in accordance with aspects of the exemplary embodiment.

FIG. 7 is an algorithm 100 for an internal ITOC mounting strategy in accordance with aspects of the exemplary embodiment. At block 110, the method begins with molding an ITOC end tank including at least one aperture extending through an external fluid port for connecting a transmission fluid line. At block 120, the method continues with disposing at least one ITOC mounting fixture internal to the ITOC end tank. As mentioned above, the at least one mounting fixture can be made replaceable or molded integral to the ITOC end tank without exceeding the scope of the exemplary embodiments.

At block 130, the method continues with aligning an ITOC having at least one fluid aperture surrounded by an O-ring with the at least one mounting fixture, and at block 140, with snapping the ITOC into the at least one mounting fixture to create a press fit fluid seal between the O-ring and the at least one aperture of the end tank.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A method for internal transmission oil cooler (ITOC) mounting comprising:
    molding an ITOC end tank including at least one aperture extending through an external fluid port for connecting a transmission fluid line;
    disposing at least one ITOC mounting fixture internal to the ITOC end tank;
    aligning an ITOC having at least one fluid aperture surrounded by an O-ring with the at least one mounting fixture; and
    snapping the ITOC into the at least one mounting fixture to create a press fit fluid seal between the O-ring and the at least one aperture of the end tank.

2. The method of claim 1 further comprises buttressing the ITOC against an internal front wall of the ITOC end tank with the at least one mounting fixture disposed on a rear wall of the ITOC end tank.

3. The method of claim 1 further comprises restricting lateral movement of the ITOC with the least one mounting fixture disposed on an internal front wall of the ITOC end tank.

4. The method of claim 1 further comprising fastening a retaining brace to at least one mounting fixture for restricting vertical elevation of the ITOC after installing.

5. The method of claim 1 wherein disposing further comprises inserting at least one replaceable ITOC mounting fixture internal to the ITOC end tank.

6. The method of claim 1 wherein disposing further comprises molding the at least one ITOC mounting fixture internal to the ITOC end tank.

7. A method for internal transmission oil cooler (ITOC) mounting comprising:
- molding an ITOC end tank including at least one aperture extending through an external fluid port for connecting a transmission fluid line;
- disposing at least one ITOC mounting fixture internal to the ITOC end tank;
- aligning an ITOC having at least one fluid aperture surrounded by an O-ring with the at least one mounting fixture;
- snapping the ITOC into the at least one mounting fixture to create a press fit fluid seal between the O-ring and the at least one aperture of the end tank; and
- buttressing the ITOC against an internal front wall of the ITOC end tank with the at least one mounting fixture disposed on a rear wall of the ITOC end tank.

8. The method of claim 7 further comprises restricting lateral movement of the ITOC with the least one mounting fixture disposed on an internal front wall of the ITOC end tank.

9. The method of claim 7 further comprising fastening a retaining brace to at least one mounting fixture for restricting vertical elevation of the ITOC after installing.

10. The method of claim 7 wherein disposing further comprises inserting at least one replaceable ITOC mounting fixture internal to the ITOC end tank.

11. The method of claim 7 wherein disposing further comprises molding the at least one ITOC mounting fixture internal to the ITOC end tank.

\* \* \* \* \*